(12) United States Patent
Terada

(10) Patent No.: US 11,980,988 B2
(45) Date of Patent: May 14, 2024

(54) BLADE REPLACING DEVICE

(71) Applicant: DISCO CORPORATION, Tokyo (JP)

(72) Inventor: Kazuki Terada, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 155 days.

(21) Appl. No.: 17/457,798

(22) Filed: Dec. 6, 2021

(65) Prior Publication Data

US 2022/0203487 A1 Jun. 30, 2022

(30) Foreign Application Priority Data

Dec. 25, 2020 (JP) ................. 2020-216255

(51) Int. Cl.
*B23Q 3/157* (2006.01)
*B24B 45/00* (2006.01)
*B23Q 3/155* (2006.01)

(52) U.S. Cl.
CPC ............ *B23Q 3/157* (2013.01); *B24B 45/006* (2013.01); *B23Q 2003/155418* (2016.11); *Y10T 483/132* (2015.01); *Y10T 483/174* (2015.01)

(58) Field of Classification Search
CPC ....... B27B 5/32; B26D 7/2621; B24B 45/006; B23Q 3/1552; B23Q 3/157; B23Q 2003/155414; B23Q 17/005; Y10T 483/132; Y10T 483/134; Y10T 483/1733; Y10T 483/1736; Y10T 483/174; Y10S 451/911
USPC ...... 483/8, 9, 30, 31, 33; 451/911; 294/64.3, 294/183
See application file for complete search history.

(56) References Cited

U.S. PATENT DOCUMENTS

| 6,030,326 | A | * | 2/2000 | Azuma | ............. B23Q 3/15722 483/30 |
| 6,341,600 | B1 | * | 1/2002 | Wakita | .................. B23D 61/10 451/343 |
| 9,636,844 | B2 | * | 5/2017 | Wakita | ..................... B27B 5/30 |

(Continued)

FOREIGN PATENT DOCUMENTS

| CN | 104589520 A | * | 5/2015 |
| JP | 2007098536 A | | 4/2007 |

(Continued)

*Primary Examiner* — Erica E Cadugan
*Assistant Examiner* — Michael Vitale
(74) *Attorney, Agent, or Firm* — GREER BURNS & CRAIN, LTD.

(57) ABSTRACT

A blade replacing device used in a cutting apparatus includes a holding section that detachably holds one surface side of a cutting blade, a moving section that relatively advances and retracts the holding section with holding the cutting blade relative to a spindle in an axial direction of the spindle, and positions the holding section at least at a mounting position at which the other surface of the cutting blade is equal to or less than a predetermined distance from a flange section of a blade mount, and at a released position at which the cutting blade is spaced from the blade mount, and a thickness information acquisition section for acquiring information concerning a thickness of the cutting blade. The mounting position of the holding section is adjusted according to the thickness of the cutting blade acquired by utilizing the thickness information acquisition section.

9 Claims, 15 Drawing Sheets

(56) References Cited

U.S. PATENT DOCUMENTS

| | | | | |
|---|---|---|---|---|
| 2001/0041650 | A1* | 11/2001 | Senga | B24B 37/20 |
| | | | | 483/33 |
| 2006/0014475 | A1* | 1/2006 | Sekiya | G06K 19/04 |
| | | | | 451/540 |
| 2006/0159533 | A1* | 7/2006 | Zeiler | B25D 17/00 |
| | | | | 408/226 |
| 2008/0306432 | A1* | 12/2008 | Kumagai | B27B 5/32 |
| | | | | 604/22 |
| 2019/0001526 | A1* | 1/2019 | Sekiya | B28D 5/0058 |
| 2019/0009379 | A1* | 1/2019 | Kiuchi | B23Q 3/15713 |
| 2019/0093670 | A1* | 3/2019 | Aggarwal | F04D 25/08 |
| 2019/0283195 | A1* | 9/2019 | Terada | H01L 21/304 |

FOREIGN PATENT DOCUMENTS

| | | | |
|---|---|---|---|
| JP | 2007208114 A | * | 8/2007 |
| JP | 2016064450 A | | 4/2016 |

* cited by examiner

BLADE REPLACING DEVICE

BACKGROUND OF THE INVENTION

Field of the Invention

The present invention relates to a blade replacing device used in a cutting apparatus.

Description of the Related Art

In order to divide a semiconductor wafer of silicon or the like with a plurality of devices formed on a front surface side thereof into individual device chips, a cutting apparatus including an annular cutting blade is used. The cutting blade is a consumable and is required to be replaced, as necessary, according to a degree of abrasion or the like. For example, in a case where an operator manually replaces the cutting blade, the used cutting blade is detached from a blade mount fixed to a tip part of a spindle, and thereafter, a new cutting blade is mounted to the blade mount.

At the time of mounting, first, a boss section of the blade mount is inserted into a through-opening of the cutting blade. Next, in a state in which the cutting blade is abutted on a flange section of the blade mount, the boss section is inserted into a presser nut, and the presser nut is fastened to a screw groove in an outer circumferential side surface of the boss section. As a result, the cutting blade is clamped between the flange section and the presser nut, and a position in an axial direction of the spindle is fixed. It is to be noted, however, that a thickness of a cutting edge of the cutting blade is very small, and breakage is liable to occur, so that a replacing operation needs operator's skill.

In view of this, a blade replacing device for automatically taking out a new cutting blade from a rack for cutting blades and mounting the new cutting blade to the blade mount has been developed (see, for example, Japanese Patent Laid-open No. 2007-98536). The cutting blade as an object to be replaced by the blade replacing device is, in general, a hub type cutting blade (namely, hub blade) that has a metallic annular base, and an annular cutting edge fixed to an outer circumferential part of the annular base. In the case of mounting the hub blade to the blade mount by use of the blade replacing device, for example, the hub blade is moved in a state in which a blade gripping unit of the blade replacing device grips the front surface side of the annular base, and the boss section is inserted into the through-hole of the annular base such that the back surface side of the annular base abuts on the flange section. The annular base of the hub blade has its thickness unified independently of the kind of the cutting edge. Therefore, in the case of mounting the hub blade to the blade mount by the blade replacing device, in general, the hub blade is moved to a predetermined position where the back surface side of the annular base abuts on the flange section, irrespectively of the thickness of the cutting edge.

However, there is also a blade replacing device for replacing a washer type cutting blade (namely, hubless blade) not having an annular base but composed of the cutting edge itself (see, for example, Japanese Patent Laid-open No. 2016-64450). The blade replacing device has a jig for suction holding the hubless blade. In the case of mounting the hubless blade to the blade mount by use of this blade replacing device, first, the front surface side of the hubless blade is suction held by the jig, and then, the jig is moved such that the back surface side of the hubless blade comes into contact with the flange section. However, the thickness of the cutting edge of the hubless blade varies, for example, in a range from 0.02 mm to 3.0 mm.

Therefore, for example, in a case where a hubless blade comparatively small in thickness of the cutting edge is mounted to the blade mount and thereafter a hubless blade comparatively large in thickness of the cutting edge is mounted in place thereof, the hubless blade comparatively large in thickness of the cutting blade is excessively pressed against the flange section. In this case, there is a fear of breakage of the hubless blade or damage to the flange section.

SUMMARY OF THE INVENTION

The present invention has been made in consideration of the aforementioned problems. It is an object of the invention to prevent breakage of a cutting blade and damage to a flange section in the case of mounting cutting blades different in thickness of a cutting edge to a blade mount.

In accordance with an aspect of the present invention, there is provided a blade replacing device used in a cutting apparatus that cuts a workpiece by an annular cutting blade mounted to a tip part of a spindle through a blade mount, the blade mount having a cylindrical boss section which projects in an axial direction of the spindle in a state of being fixed to the tip part of the spindle to be inserted into a through-opening of the cutting blade, and an annular flange section which is located on a base end part side of the boss section, projects to outside relative to the boss section in a radial direction of the boss section, and is capable of making contact with the cutting blade in a state in which the cutting blade is inserted in the boss section. The blade replacing device includes a holding section that detachably holds one surface side of the cutting blade, a moving section that relatively advances and retracts the holding section in a state of holding the cutting blade relative to the spindle in the axial direction of the spindle, and positions the holding section at least at a mounting position at which the other surface located on an opposite side of the one surface of the cutting blade is equal to or less than a predetermined distance from the flange section of the blade mount, and at a released position at which the cutting blade is spaced from the blade mount, and a thickness information acquisition section for acquiring information concerning a thickness of the cutting blade, in which the mounting position of the holding section is adjusted according to the thickness of the cutting blade acquired by utilizing the thickness information acquisition section.

Preferably, the thickness information acquisition section includes a camera unit for acquiring an image of identification information provided on the cutting blade or an accommodating case in which the cutting blade is accommodated, a reader for reading the identification information, or a measuring unit for measuring the thickness of the cutting blade.

In addition, preferably, an annular presser flange clamping the cutting blade together with the flange section is mounted to the blade mount, the presser flange has a central hole into which the boss section is inserted, and a through-hole that is provided on an outside of the central hole and penetrates from one surface side of the presser flange to the other surface side of the presser flange, and the holding section suction holds an opening exposed to the one surface side of the presser flange, of the through-hole, thereby to suction hold the cutting blade by the other surface side of the presser flange through the presser flange.

Besides, preferably, the cutting blade has an annular base section held by the holding section, and an annular grindstone section fixed to an outer circumferential part of the base section, and the holding section suction holds one surface side of the base section, thereby to suction hold the cutting blade.

The blade replacing device according to one mode of the present invention includes the holding section that detachably holds one surface side of the cutting blade, the moving section that relatively advances and retracts the holding section in the state of holding the cutting blade relative to the spindle in the axial direction of the spindle and positions the holding section at least at the mounting position and at the released position, and the thickness information acquisition section that acquires information concerning the thickness of the cutting blade. The mounting position of the holding section is adjusted according to the thickness of the cutting blade acquired by the thickness information acquisition section. Therefore, even in a case where the cutting blades different in the thickness of the cutting edge are mounted to the blade mount, breakage of the cutting blade and damage to the flange section can be prevented.

The above and other objects, features and advantages of the present invention and the manner of realizing them will become more apparent, and the invention itself will best be understood from a study of the following description and appended claims with reference to the attaching drawings showing some preferred embodiments of the invention.

DETAILED DESCRIPTION OF THE PREFERRED EMBODIMENTS

Figure 1:
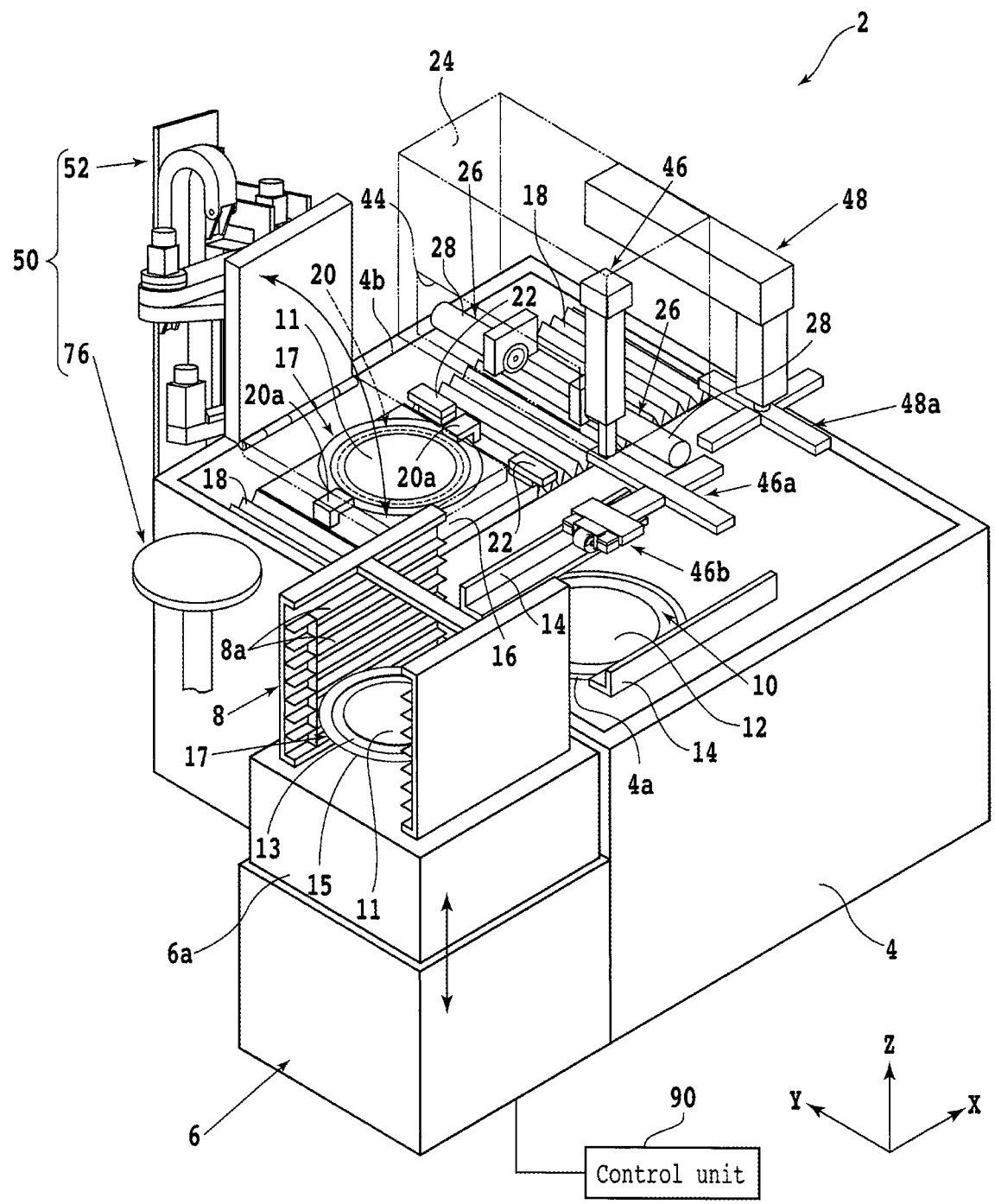
FIG. 1 is a perspective view of a cutting apparatus according to a first embodiment.

An embodiment according to one mode of the present invention will be described below referring to the attached drawings. FIG. 1 is a perspective view of a cutting apparatus 2 according to the first embodiment. An X-axis direction (processing feeding direction), a Y-axis direction (indexing feeding direction), and a Z-axis direction (vertical direction or upward-downward direction) depicted in FIG. 1 are mutually orthogonal directions. Note that, in FIG. 1, part of constituent elements is depicted with a functional block. The cutting apparatus 2 includes a base 4 that supports the constituent elements. At a corner part of the base 4, an elevator 6 that moves upward and downward by a lifting mechanism (not illustrated) is provided.

A cassette 8 is mounted on an upper surface of a lifting base 6a of the elevator 6. A plurality of pairs of support plates 8a each pair capable of supporting one workpiece 11 are provided in the cassette 8 at a predetermined interval along a height direction of the cassette 8. The workpiece 11 is, for example, a disc-shaped wafer formed of a semiconductor material such as silicon. To one surface side of the workpiece 11, a central part of a circular dicing tape 13 having a diameter larger than a diameter of the workpiece 11 is attached. In addition, one surface of a metallic annular frame 15 is attached to a peripheral part of the dicing tape 13. The workpiece 11 is accommodated in the cassette 8 in the form of a workpiece unit 17 in which the workpiece 11 is supported by the frame 15 through the dicing tape 13.

A circular opening 4a is formed in a region adjacent to one side in the X-axis direction of the elevator 6. A cleaning unit 10 for cleaning the workpiece 11 after cutting is performed is disposed in the opening 4a. The cleaning unit 10 has a spinner table 12. A nozzle (not illustrated) for jetting a gas-liquid mixed fluid in which a liquid such as pure water and air are mixed is disposed on an upper side of the spinner table 12. A pair of guide rails 14 are provided on an upper side of the cleaning unit 10.

The pair of guide rails 14 are moved, by a driving mechanism not illustrated, so as to go closer to and away from each other along the Y-axis direction. By the pair of guide rails 14, the position of the workpiece unit 17 in the Y-axis direction is adjusted. At a position adjacent to one side in the Y-axis direction with respect to the guide rails 14, a rectangular opening 4b having a longitudinal part along the X-axis direction is formed. The opening 4b is provided with a rectangular table cover 16.

On both side in the X-axis direction of the table cover 16, dustproof and dropletproof covers 18 capable of shrinking and extending in the X-axis direction are provided. On an upper side of the table cover 16, a chuck table 20 for suction holding the workpiece unit 17 is provided. An upper surface of the chuck table 20 functions as a holding surface for suction holding the workpiece unit 17 by using a negative pressure generated in a suction source (not illustrated) such as an ejector. A pair of clamp unit 22a for clamping the frame 15 of the workpiece unit 17 are provided on the table cover 16. In addition, a pair of dress tables 22 are provided on the table cover 16. A dressing board (not illustrated) for dressing a cutting blade 34 (described later) is suction held by each of the dress tables 22.

At a lower part of the chuck table 20, a rotational drive source (not illustrated) such as a motor for rotating the chuck table 20 around a rotational axis substantially parallel to the Z-axis direction is provided. At a lower part of the rotational drive source, a ball screw type X-axis moving mechanism (processing feeding unit) (not illustrated) for moving the rotational drive source and the chuck table 20 in the X-axis direction is provided. Of the opening 4b, a region adjacent to the pair of guide rails 14 in the Y-axis direction is a conveying-in/conveying-out region where conveying-in and conveying-out of the workpiece 11 are performed. Of the opening 4b, a region located on one side in the X-axis direction relative to the conveying-in/conveying-out region is a cutting region where cutting of the workpiece 11 is conducted.

On an upper side of the cutting region, a rectangular parallelepiped-shaped cover member 24 formed of a metal or the like is provided. In a space covered by the cover member 24, a pair of cutting units 26 are disposed. A ball screw type Z-axis moving mechanism (cutting-in feeding mechanism) (not illustrated) is connected to each of the cutting units 26. In addition, a ball screw type Y-axis moving mechanism (indexing feeding mechanism) (not illustrated) is connected to the Z-axis moving mechanism. Each cutting unit 26 is moved along the Z-axis direction by the Z-axis moving mechanism, and is moved along the Y-axis direction by the Y-axis moving mechanism. Here, by use of FIGS. 2 and 3, the cutting unit 26 will be described.

Figure 2:
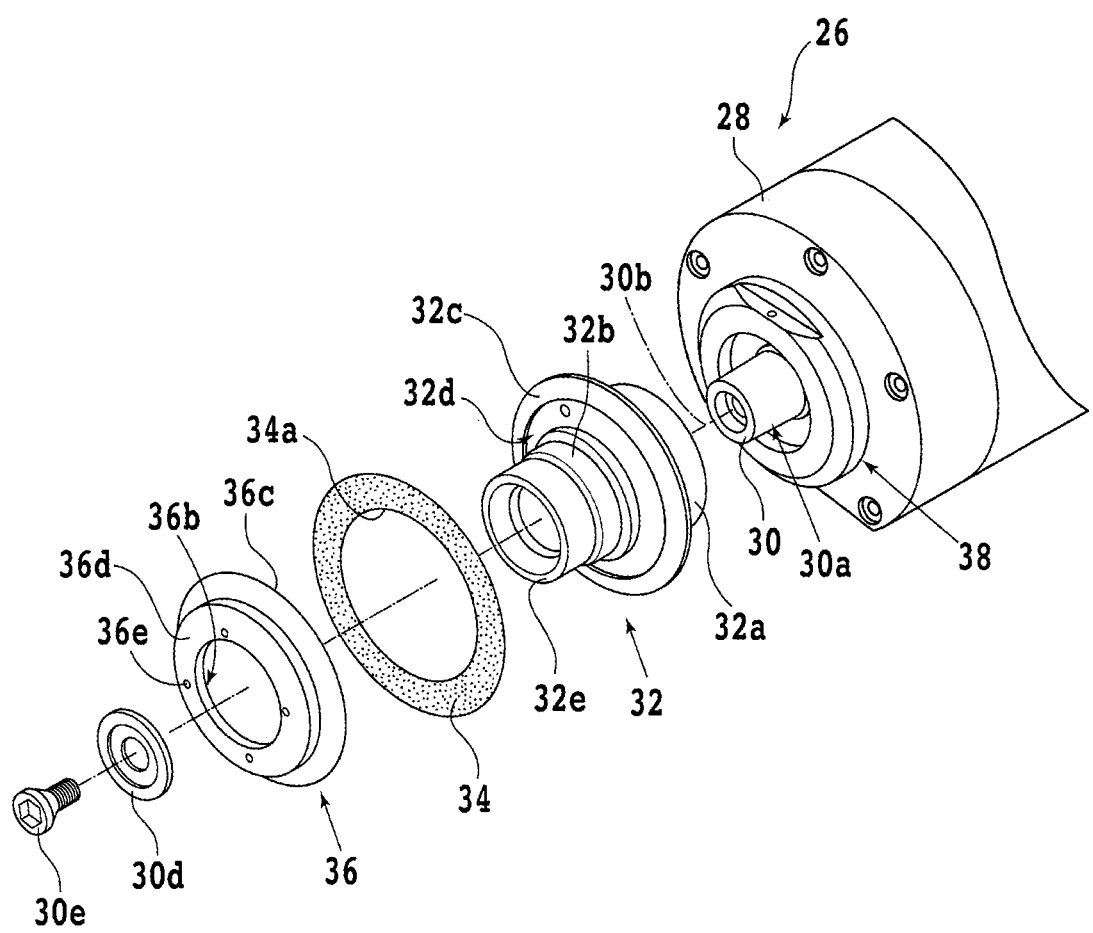
FIG. 2 is an exploded perspective view of a cutting unit.
Figure 3:
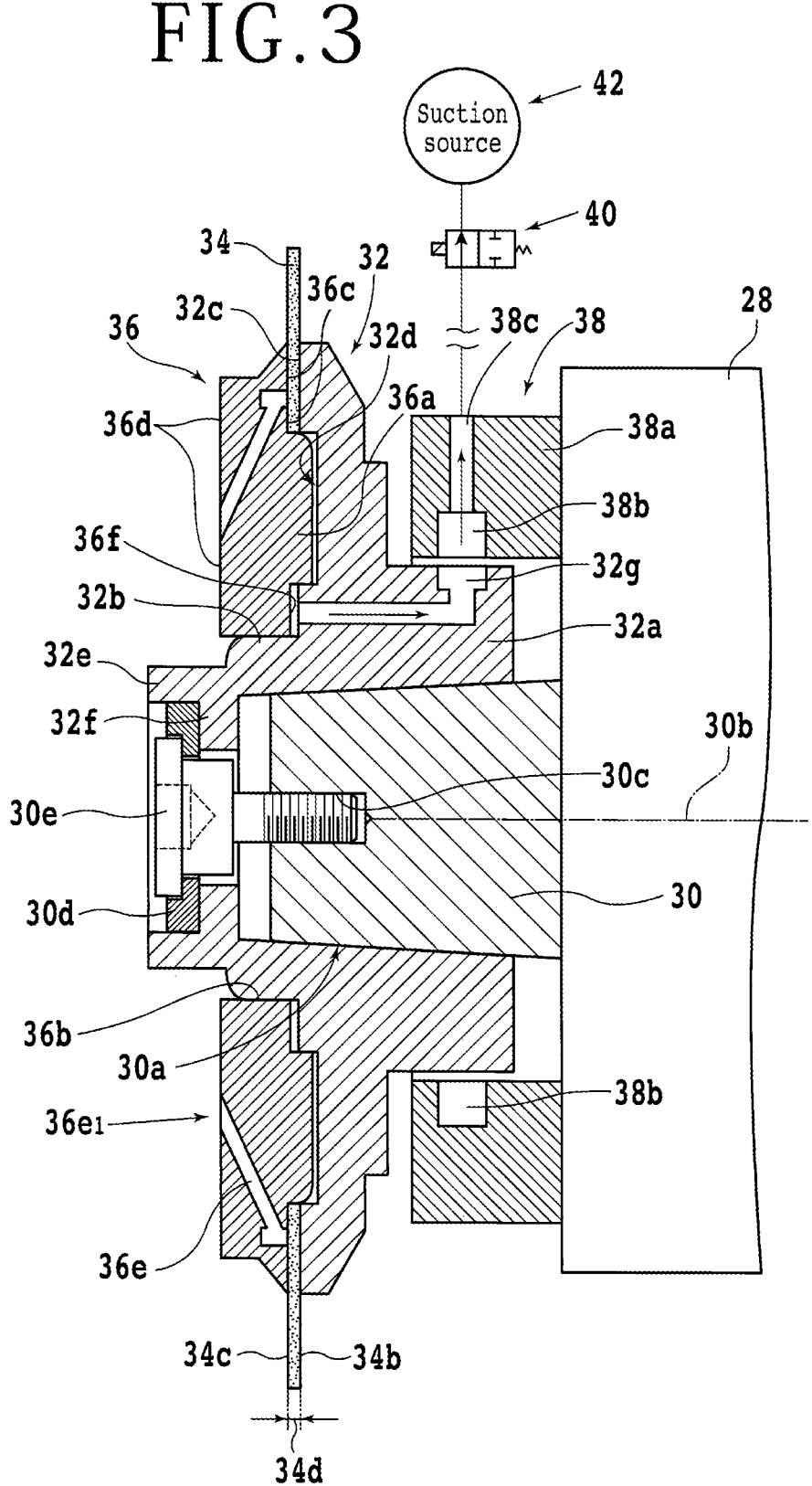
FIG. 3 is a partially sectional side view of the cutting unit.

FIG. 2 is an exploded perspective view of the cutting unit 26 according to the first embodiment, and FIG. 3 is a partially sectional side view of the cutting unit 26. The cutting unit 26 has a tubular spindle housing 28. A part of a cylindrical spindle 30 is accommodated in a rotatable manner in the spindle housing 28. The spindle 30 is provided at a base end part thereof with a rotational drive source (not illustrated) such as a servo motor.

A tip part 30a of the spindle 30 projects from the spindle housing 28. A blade mount 32 is fixed to the tip part 30a. The blade mount 32 has a first boss section 32a, and a hole part fitted to the tip part 30a is formed in the inside of the first boss section 32a. The blade mount 32 has a cylindrical second boss section 32b (boss section) projecting to a side opposite to the first boss section 32a in an axial direction 30b of the spindle 30 (namely, in the Y-axis direction). The second boss section 32b is inserted into a through-opening 34a formed in an annular cutting blade 34 (in the present embodiment, a hubless blade).

An annular flange section 32c is provided on a base end part side of the second boss section 32b and on the outer side than the second boss section 32b in a radial direction of the second boss section 32b. When the second boss section 32b is inserted into the cutting blade 34, the flange section 32c is capable of making contact with the other surface 34b of the cutting blade 34. An annular recess 32d is formed between the second boss section 32b and the flange section 32c in the radial direction of the second boss section 32b. The recess 32d functions as a receiving part for receiving an annular projecting part 36a of a presser flange 36 to be described later.

On the inner side than the second boss section 32b in the radial direction of the second boss section 32b, a third boss section 32e is formed in a manner of projecting further from the second boss section 32b. An annular receiving part 32f for receiving a washer 30d is formed on the inside of the third boss section 32e. In a state in which the washer 30d is disposed on the receiving part 32f, a male screw 30e is inserted into the inside of the third boss section 32e. When a shaft part of the male screw 30e is fastened to a screw hole 30c of the tip part 30a, the receiving part 32f is pressed by a head part of the male screw 30e through the washer 30d, and the blade mount 32 is fixed to the tip part 30a of the spindle 30.

The second boss section 32b is inserted into a central hole 36b of the annular presser flange 36. The central hole 36b is formed on the inner side than the annular projecting part 36a in a radial direction of the presser flange 36. An annular flange surface 36c (the other surface of the presser flange 36) is formed on the outer side than the projecting part 36a. In addition, an annular surface 36d (one surface of the presser flange 36) is provided on a side opposite to the projecting part 36a and the flange surface 36c.

Each of openings 36e₁ of a plurality of through-holes 36e are exposed at the annular surface 36d. The plurality of through-holes 36e are provided at substantially regular intervals in the circumferential direction of the presser flange 36, in a manner of each penetrating from the flange surface 36c to the annular surface 36d. When a negative pressure is made to act on the annular surface 36d in a state in which the flange surface 36c faces one surface 34c of the cutting blade 34 located on an opposite side of the other surface 34b, the negative pressure is transmitted to the flange surface 36c through the through-holes 36e. When the one surface 34c side is suction held on the flange surface 36c, the flange surface 36c makes contact with the one surface 34c.

The cutting blade 34 suction held through the presser flange 36 is disposed on the blade mount 32, together with the presser flange 36. After disposed on the blade mount 32, an annular surface 36f of the presser flange 36 located between the projecting part 36a and the central hole 36b is suction held toward the blade mount 32 side. An opening located at one end part of a flow channel 32g is formed on the inner side than the recess 32d in a radial direction of the blade mount 32, and an opening located at the other end part of the flow channel 32g is formed in an outer circumferential side surface of the first boss section 32a.

In a state in which the blade mount 32 is fixed to the tip part 30a, a cylindrical boss section 38a provided at the tip part of the spindle housing 28 is located at a peripheral part of the first boss section 32a. The boss section 38a is formed at an inner circumferential part thereof with an annular groove 38b over the one circumference. A suction passage 38c is connected to a position of the annular groove 38b which corresponds to a top part of the boss section 38a. The suction passage 38c is connected to a suction source 42 such as an ejector through a solenoid valve 40.

The boss section 38a, the first boss section 32a, the spindle 30, and the like constitute a rotary joint 38. When the solenoid valve 40 is put into an open state, a negative pressure acts on the flow channel 32g through the suction passage 38c and the annular groove 38b. By this negative pressure, the annular surface 36f of the presser flange 36 is sucked onto the blade mount 32, and the cutting blade 34 is clamped between the presser flange 36 and the flange section 32c. In this way, the cutting blade 34 is mounted to the tip part 30a of the spindle 30.

Here, returning to FIG. 1, other constituent elements of the cutting apparatus 2 will be described. A door section 44 is provided at a side surface on the conveying-in/conveying-out region side of the cover member 24. When the door section 44 is in an open state, the chuck table 20 can go into and out of the inside of the cover member 24 (namely, a cutting chamber). On an upper side of the base 4, a first conveying unit 46 is provided in a manner of not interfering with the cover member 24. The first conveying unit 46 can be moved in the X-axis and Y-axis directions by a first horizontal direction moving mechanism (not illustrated).

The first conveying unit 46 has an air cylinder whose longitudinal part is disposed along the Z-axis direction. At a lower end part of a rod constituting the air cylinder, a suction unit 46a is provided. The suction unit 46a has a support member which is substantially cross-shaped in top plan view, and a plurality of suction heads (not illustrated) provided on a lower surface side of the support member. The suction unit 46a, for example, sucks the frame 15 of the workpiece unit 17. At one end part on the elevator 6 side of the support member, a gripping mechanism 46b capable of gripping a part of the frame 15 is provided.

On an upper side of the first conveying unit 46, an arm section of a second conveying unit 48 is provided. The second conveying unit 48 can be moved along the X-axis and Y-axis directions by a second horizontal direction moving mechanism (not illustrated). The second conveying unit 48 also has an air cylinder whose longitudinal part is disposed along the Z-axis direction. A suction unit 48a is provided at a lower end part of a rod constituting the air cylinder. The suction unit 48a has a support member which is substantially cross-shaped in top plan view, and a plurality of suction heads (not illustrated) provided on a lower surface side of the support member.

Here, the procedure of cutting the workpiece 11 by use of the cutting apparatus 2 will be described briefly. First, in a state in which the first conveying unit 46 grips the frame 15 by the gripping mechanism 46b, the workpiece unit 17 is drawn out from the cassette 8 onto the pair of guide rails 14. After the position of the workpiece unit 17 in the Y-axis direction is adjusted by the pair of guide rails 14, the first conveying unit 46 sucks the frame 15 by the suction unit 46a, and conveys the workpiece unit 17 onto the chuck table 20 located in the conveying-in/conveying-out region.

Then, the chuck table 20 is moved into the cutting region, in a state in which the back surface side of the workpiece 11 is suction held. After alignment and the like is performed, the chuck table 20 and the cutting unit 26 are relatively moved in the X-axis direction, whereby the workpiece 11 is cut by the rotating cutting blade 34. After cutting is performed, the chuck table 20 is again returned into the conveying-in/conveying-out region. Then, the second conveying unit 48 sucks the frame 15 by the suction unit 48a, and conveys the workpiece unit 17 from the chuck table 20 to the cleaning unit 10.

The spinner table 12 is rotated in the state of suction holding the back surface side of the workpiece 11, and a gas-liquid mixed fluid is jetted from the nozzle to the front surface side of the workpiece 11, whereby the workpiece 11 is cleaned. Thereafter, the workpiece 11 is dried. After cleaning and drying are performed, the first conveying unit 46 sucks the frame 15 by the suction unit 46a, and conveys the workpiece unit 17 onto the pair of guide rails 14. Thereafter, utilizing the gripping mechanism 46b, the workpiece unit 17 is pushed into the cassette 8.

Figure 4:
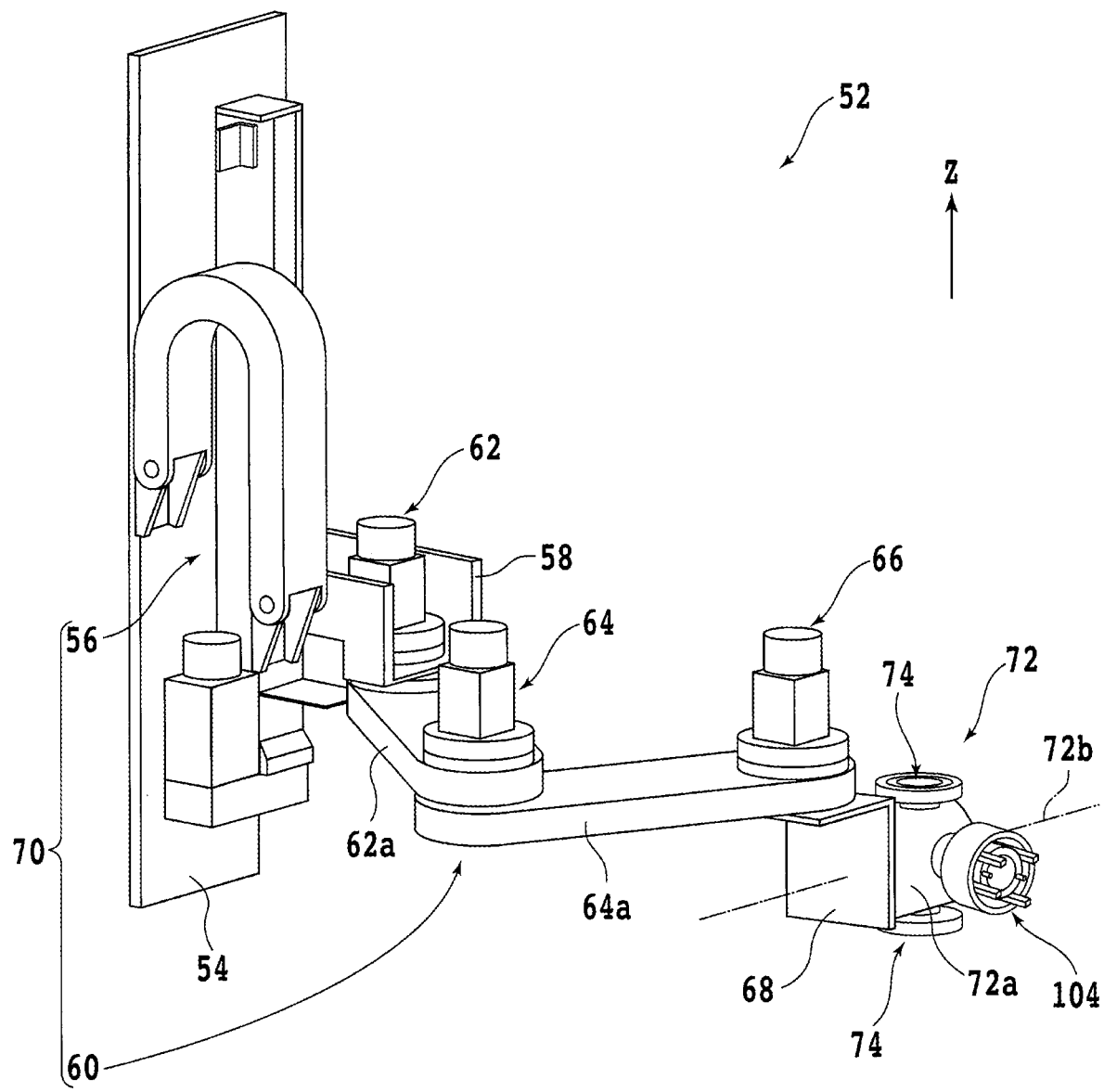
FIG. 4 is a perspective view of a blade replacing unit.

As cutting of a plurality of workpieces 11 progresses, the cutting blade 34 is worn, so that the cutting blade 34 has to be replaced. The cutting apparatus 2 of the present embodiment has a blade replacing device 50 for replacing the washer type cutting blade 34. The blade replacing device 50 has a blade replacing unit 52 for conveying, replacing, and the like of the cutting blade 34 (see FIG. 4). FIG. 4 is a perspective view of the blade replacing unit 52. The blade replacing unit 52 has a base plate 54 positionally fixed relative to the base 4.

The base plate 54 is provided with a lifting mechanism 56. The lifting mechanism 56, for example, has a motor (not illustrated) provided at a lower part of the base plate 54, and a driving pulley (not illustrated) connected to a rotary shaft of the motor. A driven pulley (not illustrated) is provided at an upper part of the base plate 54. One toothed endless belt (not illustrated) is wrapped around the driving pulley and the driven pulley, and a metallic first support tool 58 is connected to a part of the toothed endless belt.

The first support tool 58 is moved upward and downward along the Z-axis direction as the lifting mechanism 56 is operated. Note that the lifting mechanism 56 may be of a ball screw type. An articulated robot 60 is attached to the first support tool 58. The articulated robot 60 has a first rotating mechanism 62 having a rotational drive source such as a motor whose rotary shaft is disposed substantially in parallel to the Z-axis direction. One end part of a first arm 62a is attached to a rotary shaft of the first rotating mechanism 62.

A second rotating mechanism 64 is attached to the other end part of the first arm 62a. The second rotating mechanism 64 has a rotational drive source such as a motor whose rotary shaft is disposed substantially in parallel to the Z-axis direction. One end part of a second arm 64a is attached to a rotary shaft of the second rotating mechanism 64. To the other end part of the second arm 64a, a third rotating mechanism 66 is attached. The third rotating mechanism 66 has a rotational drive source such as a motor whose rotary shaft is disposed substantially in parallel to the Z-axis direction. A metallic bracket 68 is attached to a rotary shaft of the third rotating mechanism 66.

Figure 5:
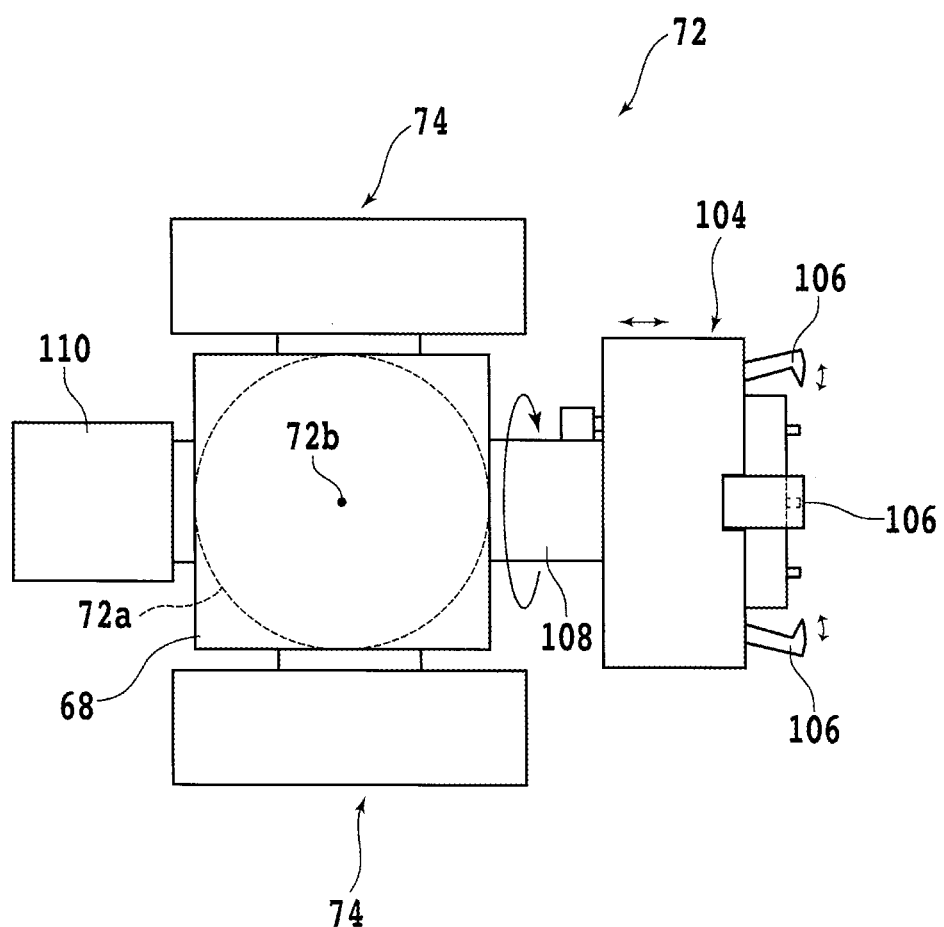
FIG. 5 is a side view of a replacing mechanism.

A replacing mechanism 72 for replacing the cutting blade 34 is fixed to the bracket 68. The lifting mechanism 56 and the articulated robot 60 constitute a moving section 70 for moving the replacing mechanism 72. FIG. 5 is a side view of the replacing mechanism 72. The replacing mechanism 72 has a substantially cylindrical housing 72a. A rotational drive source (not illustrated) such as a motor for rotating the housing 72a around a rotary shaft 72b located substantially at the center of a cylinder is accommodated in the inside of the housing 72a.

At a side surface of the housing 72a, a pair of holding jigs 74 (holding sections) are disposed such that the rotary shaft 72b is interposed therebetween. Each of the holding jigs 74 can detachably hold the one surface 34c side of the cutting blade 34. The holding jig 74 has a bottomed cylindrical frame body formed of a metal or the like. An annular lip section (not illustrated) used at the time of attaching and detaching the presser flange 36 is disposed in the vicinity of an opening part inside the frame body. The lip section is formed from an elastic material such as rubber, resin, or elastomer.

A surface of the lip section is formed with a plurality of first openings (not illustrated) along the circumferential direction of the lip section. Each of the first openings is connected to a first flow channel (not illustrated) connected to a suction source (not illustrated) such as an ejector, and a second flow channel (not illustrated) connected to an air supply source (not illustrated) that jets air. The first flow channel and the second flow channel are individually provided with solenoid valves (not illustrated), and, when the first flow channel is set into an open state and the second flow channel is set into a closed state, a negative pressure is transmitted to the first openings. For example, the presser flange 36 is suction held on the lip section by this negative pressure.

On the other hand, when the first flow channel is set into a closed state and the second flow channel is set into an open state, air is jetted from the first openings. The jetting of air is utilized when the presser flange 36 is separated from the lip section. In addition, an annular non-contact suction section (not illustrated) formed from a metal or the like is provided between an inner circumferential side surface of the frame body and an outer circumferential side surface of the lip section. An outer circumferential side surface of the non-contact suction section is formed with a plurality of second openings (not illustrated) along the circumferential direction of the non-contact suction section.

Figure 6:
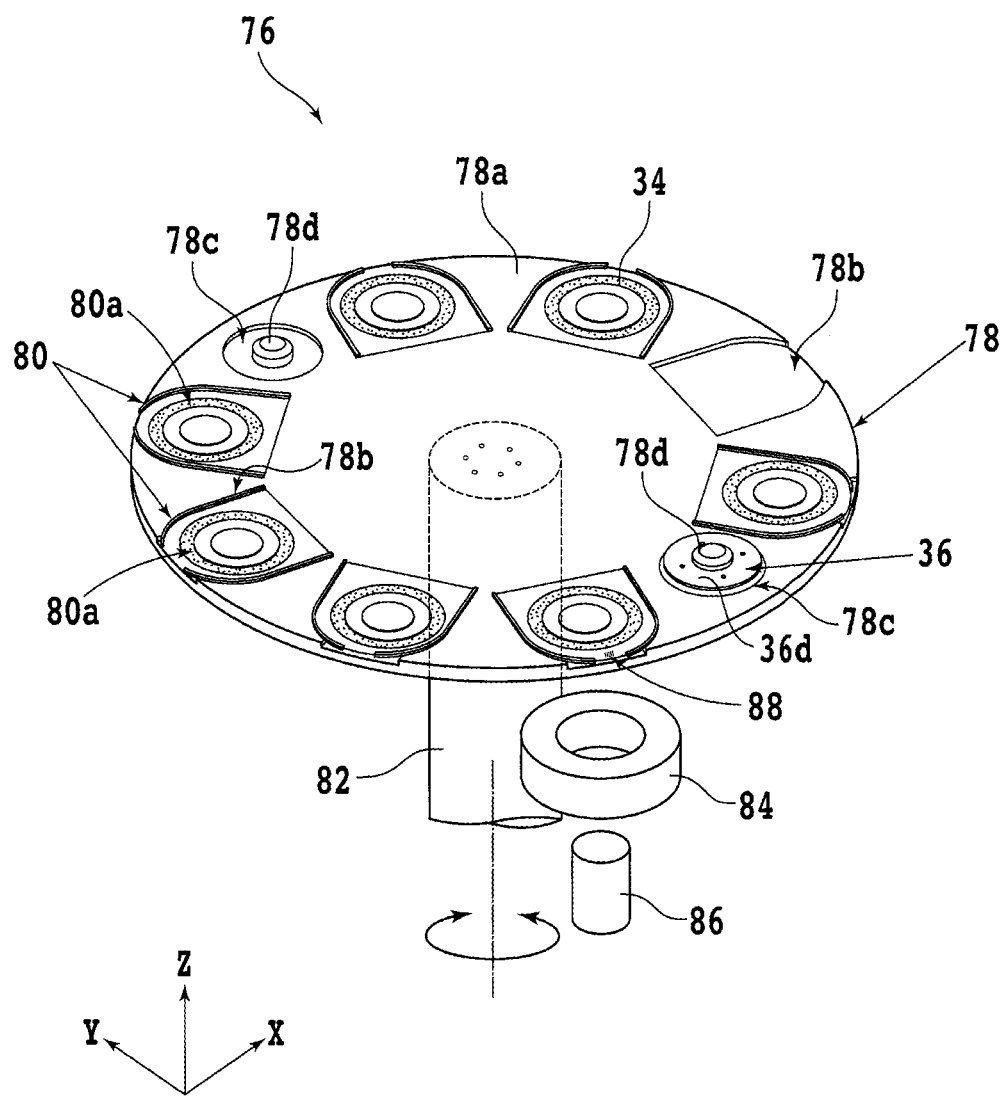
FIG. 6 is a perspective view of a blade stock section.

Each of the second openings is connected to the aforementioned air supply source (not illustrated) through a third flow channel (not illustrated). The third flow channel is also provided with a solenoid valve (not illustrated). When the third flow channel is set into an open state and air is jetted from each second opening, a rotational flow is formed, and a negative pressure is generated in the vicinity of the rotational center of the rotational flow according to Bernoulli's law. The negative pressure formed in this way is utilized when the cutting blade 34 disposed at a blade stock section 76 (see FIG. 6) is suction held on the holding jigs 74 through the presser flange 36. FIG. 6 is a perspective view of the blade stock section 76.

The blade stock section 76 has a disc-shaped stock board 78. The stock board 78 of the present embodiment is formed from a substantially transparent material (for example, acrylic resin) that transmits visible light. The stock board 78 has a plurality of first recesses 78b formed on an upper surface 78a side thereof, the plurality of first recesses 78b for accommodating respective accommodating cases 80 along the circumferential direction of the stock board 78. The accommodating case 80 made of a substantially transparent resin is disposed in each of the first recesses 78b.

Note that in FIG. 6, for convenience' sake, one accommodating case 80 is omitted. The accommodating case 80 is formed in a central part thereof with a disc-shaped projecting section 80a, and the through-opening 34a of the cutting blade 34 is disposed at the projecting section 80a, whereby one cutting blade 34 is accommodated in one accommodating case 80. In addition, on the upper surface 78a side, a second recess 78c for accommodating the presser flange 36 is formed. The second recess 78c is an annular recess, and, at a central part of the recess, a cylindrical projecting section 78d to be inserted into the central hole 36b of the presser flange 36 is provided.

The presser flange 36 is accommodated in the second recess 78c in such a manner that the annular surface 36d faces upward. A rotary shaft 82 is connected to a lower surface side of a central part of the stock board 78. A ring illumination 84 is disposed on an outer side than the rotary shaft 82 and on a lower side of the stock board 78. On a lower side of a through-hole of the ring illumination 84, a camera unit (thickness information acquisition section) 86 is disposed in a manner of facing upward. The camera unit 86 has an objective lens and an imaging element such as a complementary metal-oxide-semiconductor (CMOS) image sensor or a charge-coupled device (CCD) image sensor. The camera unit 86 acquires an image of identification information 88 provided on the accommodating case 80 or the cutting blade 34.

The identification information 88 includes a bar code, a two-dimensional code, characters, figure, symbols, or the like. In the example depicted in FIG. 6, the identification information 88 is provided on the accommodating case 80, and the identification information 88 may be provided on the cutting blade 34 (see FIG. 9A). Note that the identification information 88 may be printed directly on the accommodating case 80 or the cutting blade 34, or a seal on which the identification information 88 is printed may be attached to the accommodating case 80 or the cutting blade 34.

The cutting blade 34 is formed, for example, by mixing abrasive grains of diamond, cubic boron nitride (cBN), or the like with a binder such as a metal, a ceramic, or a resin. Therefore, ruggedness arising from the abrasive grains is formed on the surface of the cutting blade 34. In contrast, the surface of the accommodating case 80 is smaller in ruggedness than the surface of the cutting blade 34. Therefore, in a case where the identification information 88 is provided on the surface of the accommodating case 80, the image of the identification information 88 can be acquired by the camera unit 86 more accurately, as compared to a case where the identification information 88 is provided on the surface of the cutting blade 34.

The identification information 88 includes, for example, a thickness 34d of the cutting blade 34 (see FIG. 3), an outside diameter, an inside diameter, the kind of the abrasive grains, a grain size of the abrasive grains, a degree of concentration, the kind of the bond, a serial number, information for specifying the accommodating case 80 for the cutting blade 34 to be accommodated, and the like. By analyzing and reading the image acquired by the camera unit 86 by a control unit 90 (see FIG. 1) of the cutting apparatus 2, the information concerning the thickness 34d of the cutting blade 34 set to various values in the range of, for example, 10 μm to 5 mm is acquired.

The control unit 90 includes, for example, a computer, and includes a processor (processing device) represented by a central processing unit (CPU), a main storage device such as a dynamic random access memory (DRAM), a static random access memory (SRAM), or a read only memory (ROM), and an auxiliary storage device such as a flash memory, a hard disk drive, or a solid state drive. A software including a predetermined program is stored in the auxiliary storage device. By operating the processing device and the like according to the software, the functions of the control unit 90 are realized. A program for reading the information concerning the thickness 34d of the cutting blade 34, and the other types of information, based on the image acquired by the camera unit 86, is also stored in the auxiliary storage device.

In a case where, for example, the identification information 88 is composed of one-dimensional codes, two-dimensional codes, or the like, the program for reading information concerning the thickness 34d or the other types of information decodes these codes. In addition, in a case where the identification information 88 is composed of characters, the program may perform optical character recognition (OCR). The control unit 90 also controls the operations of the elevator 6, the cleaning unit 10, the guide rails 14, the chuck table 20, the cutting unit 26, the first conveying unit 46, the second conveying unit 48, the blade replacing device 50, and the like.

The control unit 90 operates the Y-axis moving mechanism of the cutting unit 26, the lifting mechanism 56, the articulated robot 60, and the like, whereby the holding jig 74 is positioned at least at a mounting position and at a released position. The mounting position of the holding jig 74 is a position of the holding jig 74 suction holding the cutting blade 34, the position where the other surface 34b of the cutting blade 34 is equal to or less than a predetermined distance from the flange section 32c of the blade mount 32 (see FIGS. 7A, 7B, 8A, and 8B).

For example, when the holding jig 74 is located at the mounting position, the other surface 34b of the cutting blade 34 makes contact with the flange section 32c of the blade mount 32. Note that, when the holding jig 74 is at the mounting position, a slight gap (for example, a gap on the order of approximately 0.1 mm to 1.0 mm) may be formed between the other surface 34b and the flange section 32c. In addition, the released position of the holding jig 74 is a position of the holding jig 74 suction holding the cutting blade 34, the position where the cutting blade 34 is located at a position spaced from the blade mount 32 (see, for example, FIG. 9A). For example, when the holding jig 74 is at the released position, the other surface 34b of the cutting blade 34 is located at a position spaced by a predetermined distance from the tip part of the third boss section 32e in the axial direction 30b.

Next, the procedure of replacing the cutting blade 34 by utilizing the holding jig 74 will be described. Prior to replacement of the cutting blade 34, first, the mounting position of the holding jig 74 is set (teaching step). In the teaching step, for example, the operator sets spatial coordinates of the mounting position while observing the position of the holding jig 74 by utilizing an optical camera (not illustrated) provided in the cutting apparatus 2.

Specifically, in a state in which the cutting blade 34 having a predetermined thickness 34d is suction held by the holding jig 74 through the presser flange 36, the cutting unit 26 and the holding jig 74 are relatively advanced or retracted along the Y-axis direction (axial direction 30b), whereby the mounting position is determined, and the spatial coordinates of the mounting position are stored in the control unit 90. Note that the aforementioned observation, advancing or retracting, determination, and the like are conducted by utilizing a display input device (for example, a touch panel) (not illustrated) provided in the cutting apparatus 2.

After the teaching step is performed, replacement of the cutting blade 34 is conducted at a suitable timing (replacing step). In the replacing step, first, by utilizing the camera unit 86, information concerning the thickness 34d of the new cutting blade 34, and the other types of information are acquired (see FIG. 6). Next, utilizing the moving section 70, the replacing mechanism 72 is moved onto the blade stock section 76, and the new cutting blade 34 is suction held by the holding jig 74 on one side through the presser flange 36.

Subsequently, the replacing mechanism 72 is moved into the inside of the cover member 24 by way of the door section 44, and the holding jig 74 on the other side different from the holding jig 74 on the one side is made to face the presser flange 36 mounted to the blade mount 32. Then, the cutting unit 26 is moved by the Y-axis moving mechanism such that the spindle 30 approaches the holding jig 74 on the other side, and the presser flange 36 mounted to the blade mount 32 and the used cutting blade 34 are suction held by the holding jig 74 on the other side. Note that, in this instance, the solenoid valve 40 connected to the rotary joint 38 is put in a closed state.

After the used cutting blade 34 is suction held by the holding jig 74 on the other side, the cutting unit 26 is moved (retracted) such that the holding jig 74 on the other side is spaced away from the blade mount 32 in the Y-axis direction. As a result, the holding jig 74 on the other side is moved relative to the blade mount 32 and the spindle 30, and is moved to the released position. Next, the replacing mechanism 72 is rotated by 180 degrees around the rotary shaft 72b, after which the cutting unit 26 is moved (advanced) such that the holding jig 74 on the one side approaches the blade mount 32 along the Y-axis direction. As a result, the holding jig 74 on the one side is moved relative to the blade mount 32 and the spindle 30, and is moved to the mounting position.

Note that, in the replacing step, only the cutting blade 34 may be replaced, without replacing the presser flange 36 already mounted to the blade mount 32. Specifically, first, in a state in which the used cutting blade 34 and the presser flange 36 are suction held by the holding jig 74 on the one side, the holding jig 74 on the one side is moved to the blade stock section 76. Then, the used cutting blade 34 is disposed in the empty accommodating case 80, after which the new cutting blade 34 is suction held by the holding jig 74 on the one side through the presser flange 36. Thereafter, the holding jig 74 on the one side is disposed at the mounting position. In this way, the cutting blade 34 can also be replaced.

Figure 7A:
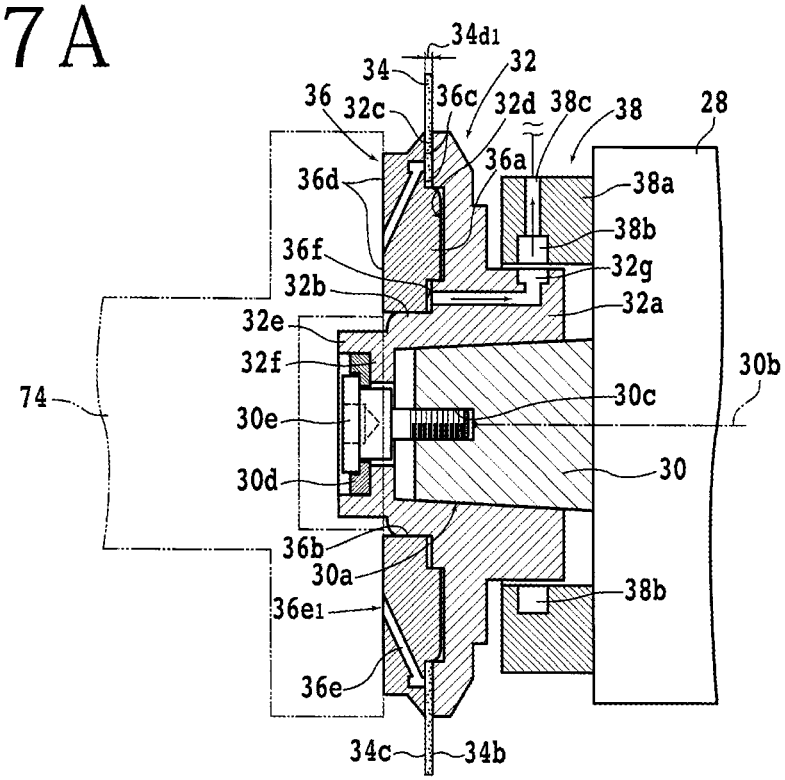
FIG. 7A is a diagram depicting a manner of mounting a cutting blade having a first thickness.

The mounting position of the holding jig 74 on the one side is adjusted according to the thickness 34d of the new cutting blade 34. FIG. 7A is a diagram depicting a manner in which the new cutting blade 34 having a first thickness $34d_1$ is mounted to the blade mount 32. The first thickness $34d_1$ is larger than the thickness 34d of the cutting blade 34 used in the teaching step. In this case, the control unit 90 reduces the advancing amount of the cutting unit 26 according to a difference between the thicknesses 34d and $34d_1$, thereby to adjust the mounting position of the holding jig 74 on the one side. Therefore, even in a case where the new cutting blade 34 having the first thickness $34d_1$ different from the set thickness 34d is mounted to the blade mount 32, damage to the new cutting blade 34 and damage to the flange section 32c can be prevented.

Figure 7B:
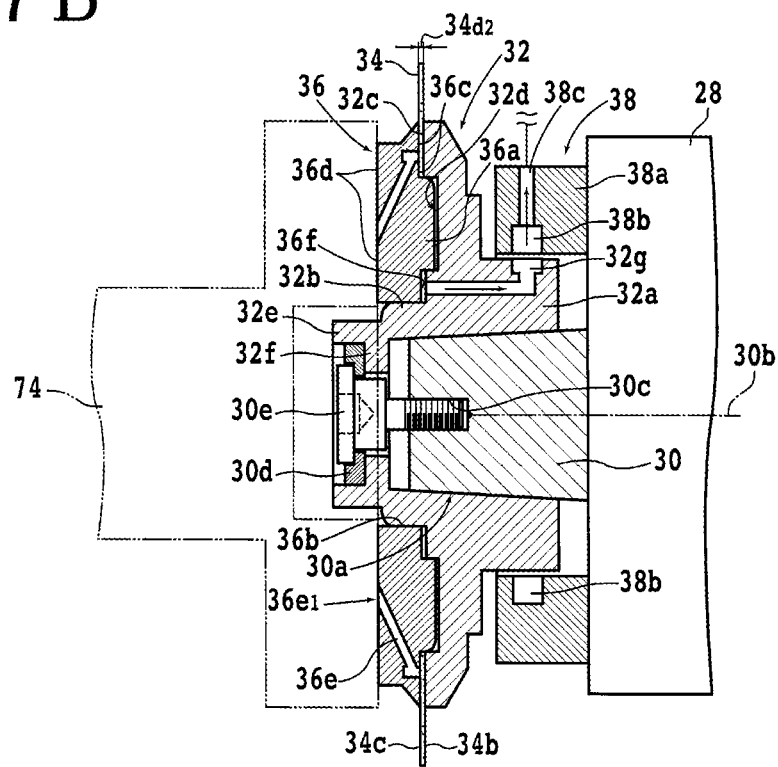
FIG. 7B is a diagram depicting a manner of mounting a cutting blade having a second thickness.

FIG. 7B is a diagram depicting a manner in which the new cutting blade 34 having a second thickness $34d_2$ is mounted to the blade mount 32. The second thickness $34d_2$ is smaller than the thickness 34d of the cutting blade 34 used in the teaching step. In this case, the control unit 90 increases an advancing mount of the cutting unit 26 according to a difference between the thicknesses 34d and $34d_2$, thereby to adjust the mounting position of the holding jig 74 on the one side. Therefore, damage to the new cutting blade 34 and damage to the flange section 32c can be prevented, and the new cutting blade 34 and the presser flange 36 can suitably be disposed on the blade mount 32.

Figure 8A:
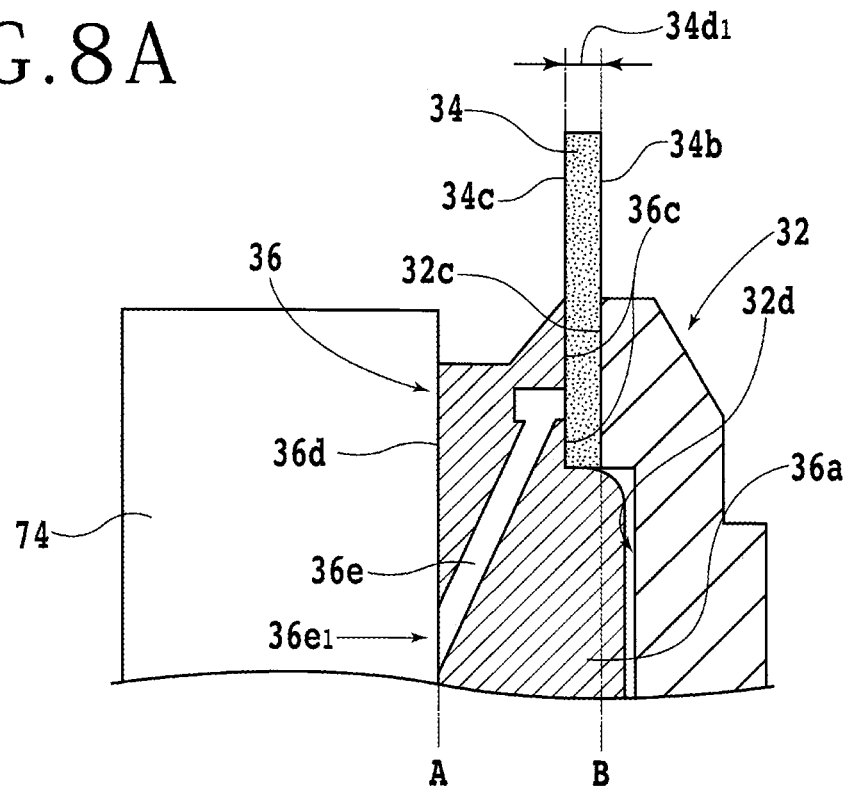
FIG. 8A is a partial enlarged view of FIG. 7A.
Figure 8B:
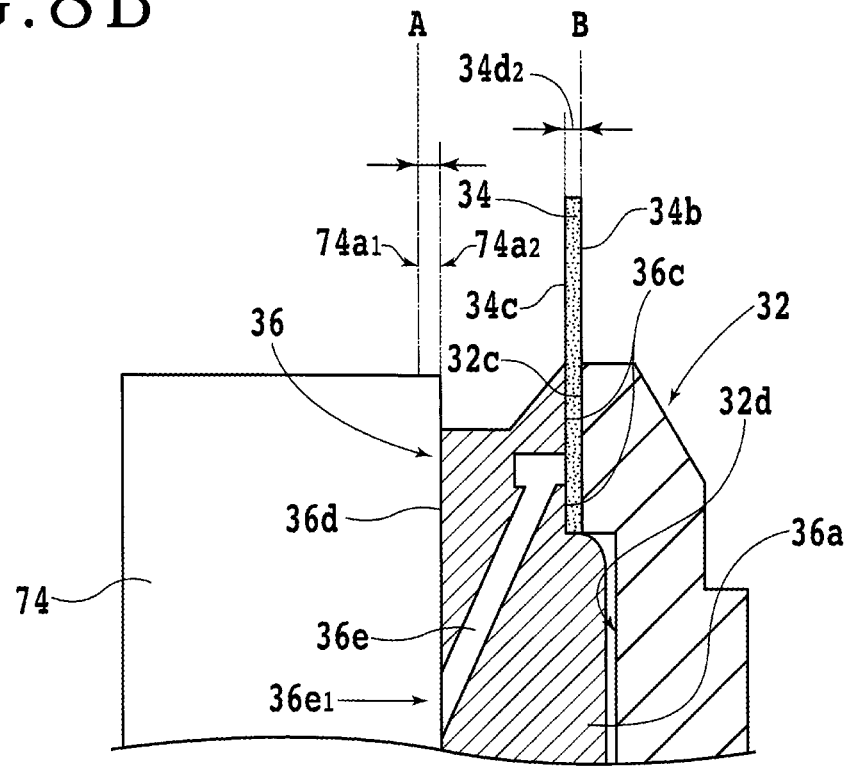
FIG. 8B is a partial enlarged view of FIG. 7B.

FIG. 8A is a partial enlarged view of FIG. 7A, and FIG. 8B is a partial enlarged view of FIG. 7B. Note that A in FIG. 8A corresponds to A in FIG. 8B, and B in FIG. 8A corresponds to B in FIG. 8B. As depicted in FIG. 8A, in a case where the cutting blade 34 having the comparatively large first thickness $34d_1$ is mounted to the blade mount 32, the control unit 90 disposes a tip part of the holding jig 74 at a mounting position $74a_1$ (see FIG. 8B). In contrast, in a case where the cutting blade 34 having the comparatively small second thickness $34d_2$ is mounted to the blade mount 32, the control unit 90 disposes the tip part of the holding jig 74 at a mounting position $74a_2$ nearer to the flange section 32c than the mounting position $74a_1$ as depicted in FIG. 8B.

Figure 9A:
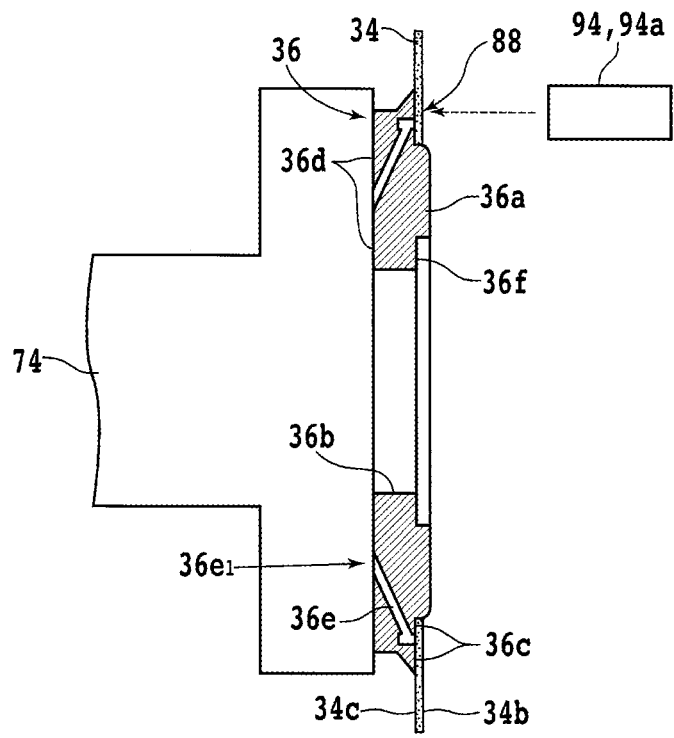
FIG. 9A is a diagram depicting a manner of acquiring an image of identification information.

Next, a modification of the method for acquiring thickness information concerning the cutting blade 34 will be described. FIG. 9A is a diagram depicting a manner in which an image of identification information 88 provided on the cutting blade 34 by a camera unit (thickness information acquisition section) 94 different from the camera unit 86 on the blade stock section 76. The camera unit 94 is, for example, fixed to a freely selected position on the base 4. When the other surface 34b of the cutting blade 34 whose one surface 34c is suction held by the holding jig 74 through the presser flange 36 is made to face the camera unit 94, the camera unit 94 can acquire the image of the identification information 88 provided on the other surface 34b.

Note that the camera unit 94 may be of a portable type which the operator can hold by hand. In this case, the operator brings the camera unit 94 close to the blade stock section 76, whereby the image of the identification information 88 provided on the accommodating case 80 or the cutting blade 34 can be acquired by the camera unit 94. In addition, the camera unit 94 may be provided on the replacing mechanism 72 of the blade replacing unit 52. In this case, when the holding jig 74 approaches the cutting blade 34 disposed at the blade stock section 76, the image of the identification information 88 provided on the accommodating case 80 or the cutting blade 34 can be acquired by the camera unit 94.

Figure 9B:
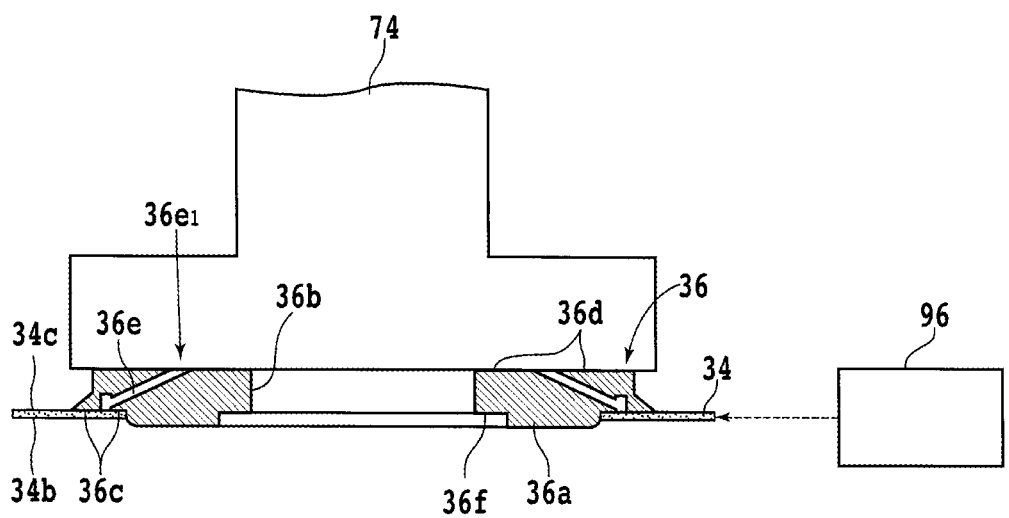
FIG. 9B is a diagram depicting a manner of acquiring an image of a thickness of a cutting edge.

Incidentally, in a case where the rotary shaft 82 of the blade stock section 76 is disposed along a predetermined direction substantially orthogonal to the Z-axis direction, the image of the identification information 88 may be acquired by use of the camera unit 86 disposed such that an optical axis of an objective lens (not illustrated) is along the predetermined direction. FIG. 9B is a diagram depicting a manner in which the image of the thickness 34*d* of the cutting blade 34 is acquired by a camera unit (measuring unit) 96 in another modification. The camera unit 96 may be fixed at a freely selected position on the base 4. Note that the camera unit 96 may be of a portable type which the operator can hold by hand.

For example, as shown in FIG. 9B, when the positions of the holding jig 74 and the camera unit 96 are adjusted such that a center axis of the cutting blade 34 and an optical axis of an objective lens (not illustrated) of the camera unit 96 are substantially orthogonal to each other and the camera unit 96 is disposed at a side surface of the cutting edge, an image of the cutting edge can be acquired. The acquired image is subjected to image processing by a predetermined program installed in the control unit 90. An actual length corresponding to one pixel is previously determined, and when a predetermined program converts the number of pixels in the thickness direction of the cutting blade into the actual length, the thickness 34*d* is thereby calculated.

Note that, as the measuring unit, a reflection type laser displacement gauge (not illustrated) having one or two sensor heads can also be used in place of the camera units 94 and 96. The sensor head has a semiconductor laser that emits a laser beam. In addition, the sensor head has a light receiving element that receives reflected light of the laser beam applied to the object of measurement. For example, the two sensor heads are disposed so as to face each other with the cutting blade 34 interposed therebetween, and a distance from one sensor head to the other surface 34*b* and a distance from the other sensor head to the one surface 34*c* are subtracted from a distance between the two sensor heads, whereby the thickness 34*d* is calculated.

Note that calculation of the thickness 34*d* may be conducted by a processor provided in the reflection type laser displacement gauge. In addition, the acquisition of the information concerning the thickness 34*d* of the cutting blade 34 is not limited to the acquisition of the image by the camera units 86, 94, and 96 and the thickness measurement by the laser displacement gauge. For example, in a case where the identification information 88 is a bar code or a two-dimensional code, the identification information 88 can also be read by use of a reader (scanner) 94*a* as the thickness information acquisition section (see FIG. 9A). The reader 94*a* has a light source, a line sensor or an area sensor for receiving reflected light from the light source, and a processor for decoding a signal received by the sensor.

Note that, in a case where the identification information 88 is a bar code, the reader 94*a* may have a light source capable of applying a laser beam, a polygon mirror for scanning the laser beam, a sensor for receiving reflected light, and a processor for decoding a signal received by the sensor. In addition, for example, in a case where an integrated circuit (IC) tag, a radio frequency identifier (RFID) tag, or the like storing information concerning the thickness 34*d* is provided on the cutting blade 34, a non-contact type reader (thickness information acquisition section) 94*a* such as an IC reader or an RFID reader for reading information from the IC tag or the RFID tag can also be used in place of the camera units 86, 94, and 96.

Figure 10:
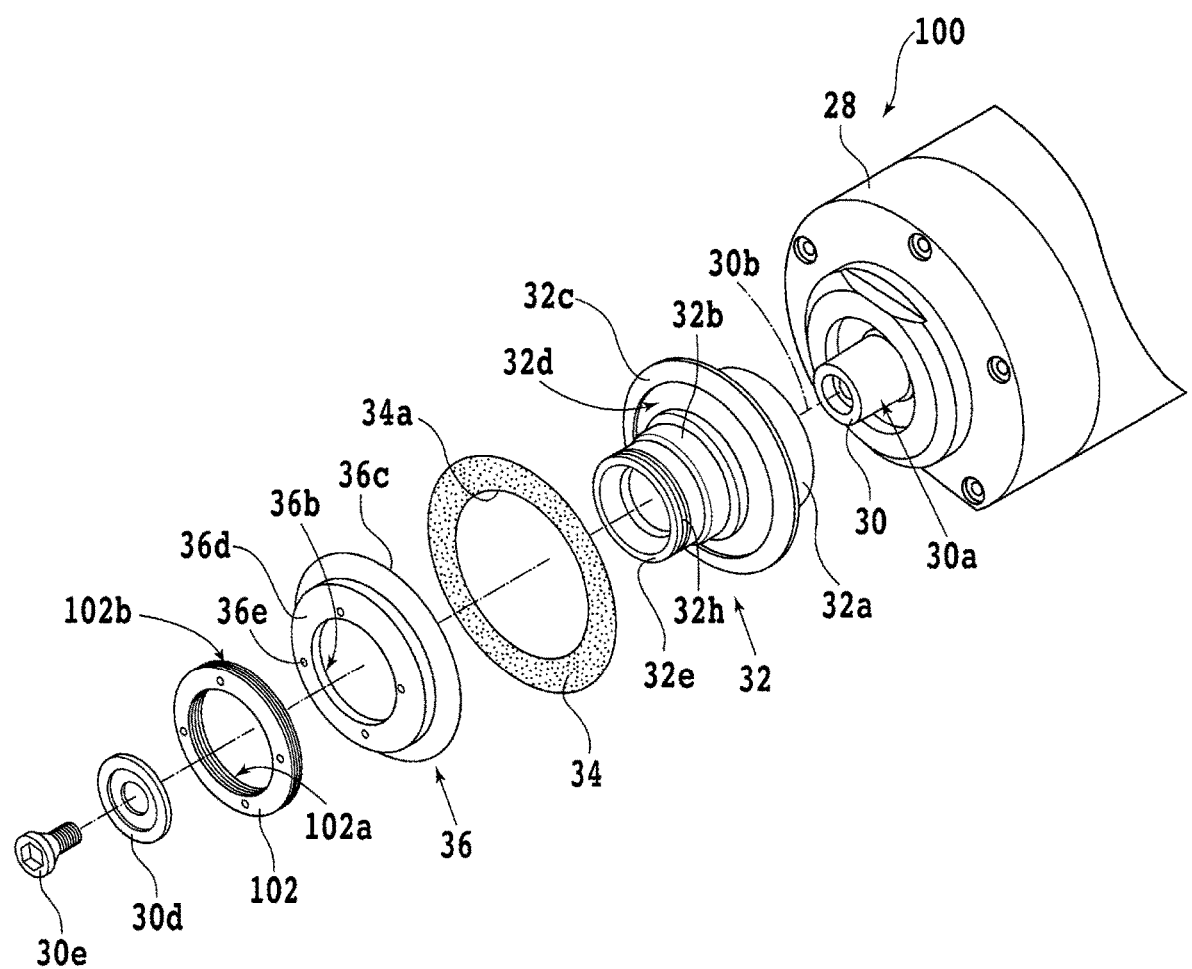
FIG. 10 is an exploded perspective view of a cutting unit according to a second embodiment.
Figure 11:
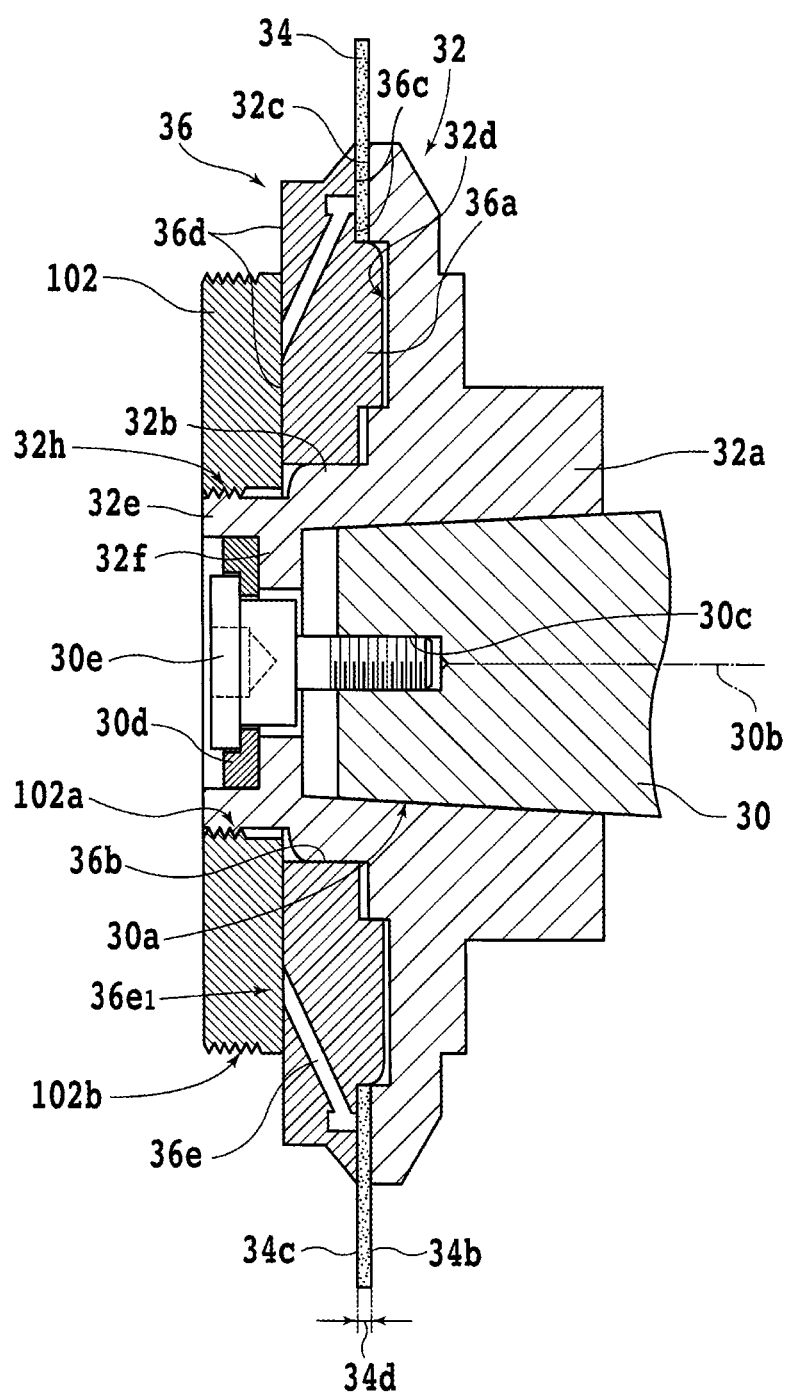
FIG. 11 is a partially sectional side view of the cutting unit according to the second embodiment.

Next, a second embodiment will be described. FIG. 10 is an exploded perspective view of a cutting unit 100 according to the second embodiment, and FIG. 11 is a partially sectional side view of the cutting unit 100 according to the second embodiment. The cutting unit 100 does not have the rotary joint 38. In the cutting unit 100, instead of using suction by a negative pressure, a presser nut 102 formed with a female screw 102*a* on an inner circumferential side surface is fastened to a screw groove 32*h* formed in the third boss section 32*e* of the blade mount 32, whereby the cutting blade 34 is clamped between the presser flange 36 and the flange section 32*c*. As a result, the cutting blade 34 is mounted to the tip part 30*a* of the spindle 30.

Also in the second embodiment, as in the first embodiment, the control unit 90 adjusts the mounting position of the holding jig 74 according to the difference from the set thickness 34*d*. As a result, damage to the cutting blade 34 and damage to the flange section 32*c* can be prevented. An outer circumferential side surface of the presser nut 102 is formed with an annular groove 102*b* utilized when the presser nut 102 is gripped. The presser nut 102 is rotated by a nut holding section 104 (see FIGS. 4 and 5) of the replacing mechanism 72.

As depicted in FIGS. 4 and 5, the nut holding section 104 has four claw parts 106 for holding an outer circumferential part of the presser nut 102. A base end part of each of the claw parts 106 is connected to a rotary shaft 108. A driving section 110 such as a motor is connected to the rotary shaft 108. When the driving section 110 is operated, each claw part 106 is rotated around the rotary shaft 108. The rotary shaft 108 can be rotated in one direction depicted in FIG. 5 and in the other direction opposite to the one direction. For example, when the nut holding section 104 is rotated in the one direction, the presser nut 102 is fastened to the third boss section 32*e*, and, when the nut holding section 104 is rotated in the other direction, the presser nut 102 is detached from the third boss section 32*e*.

Figure 12:
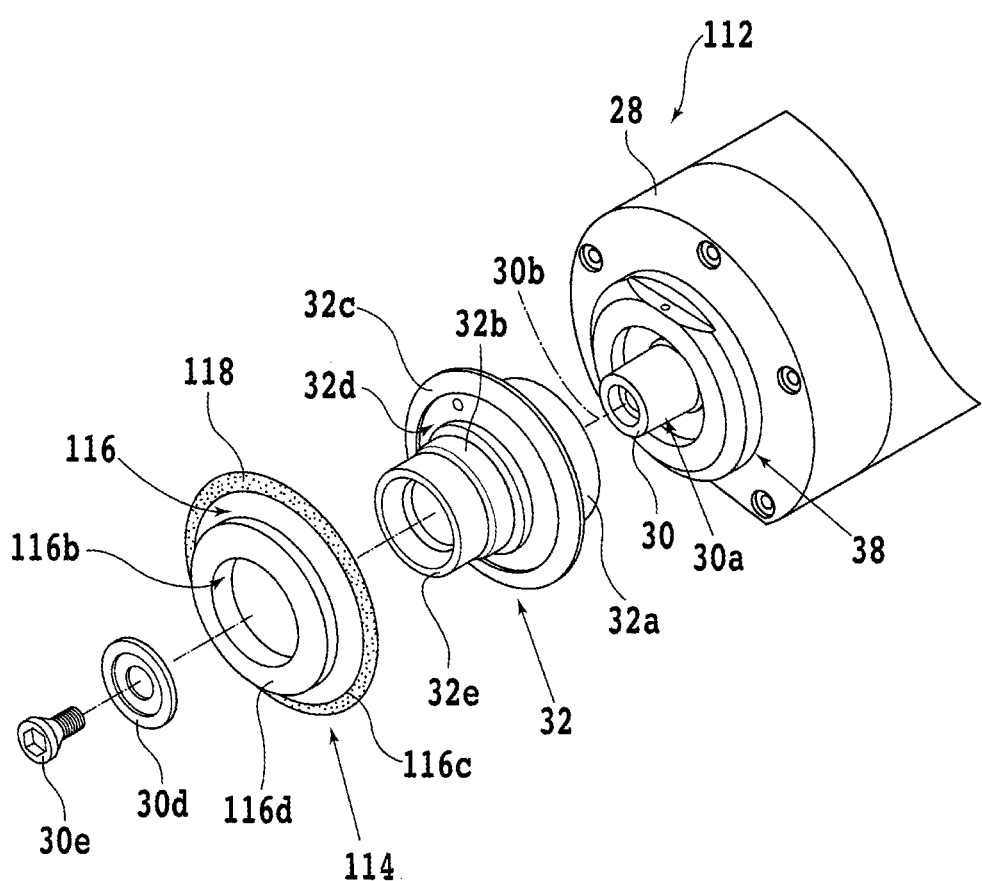
FIG. 12 is an exploded perspective view of a cutting unit according to a third embodiment.
Figure 13:
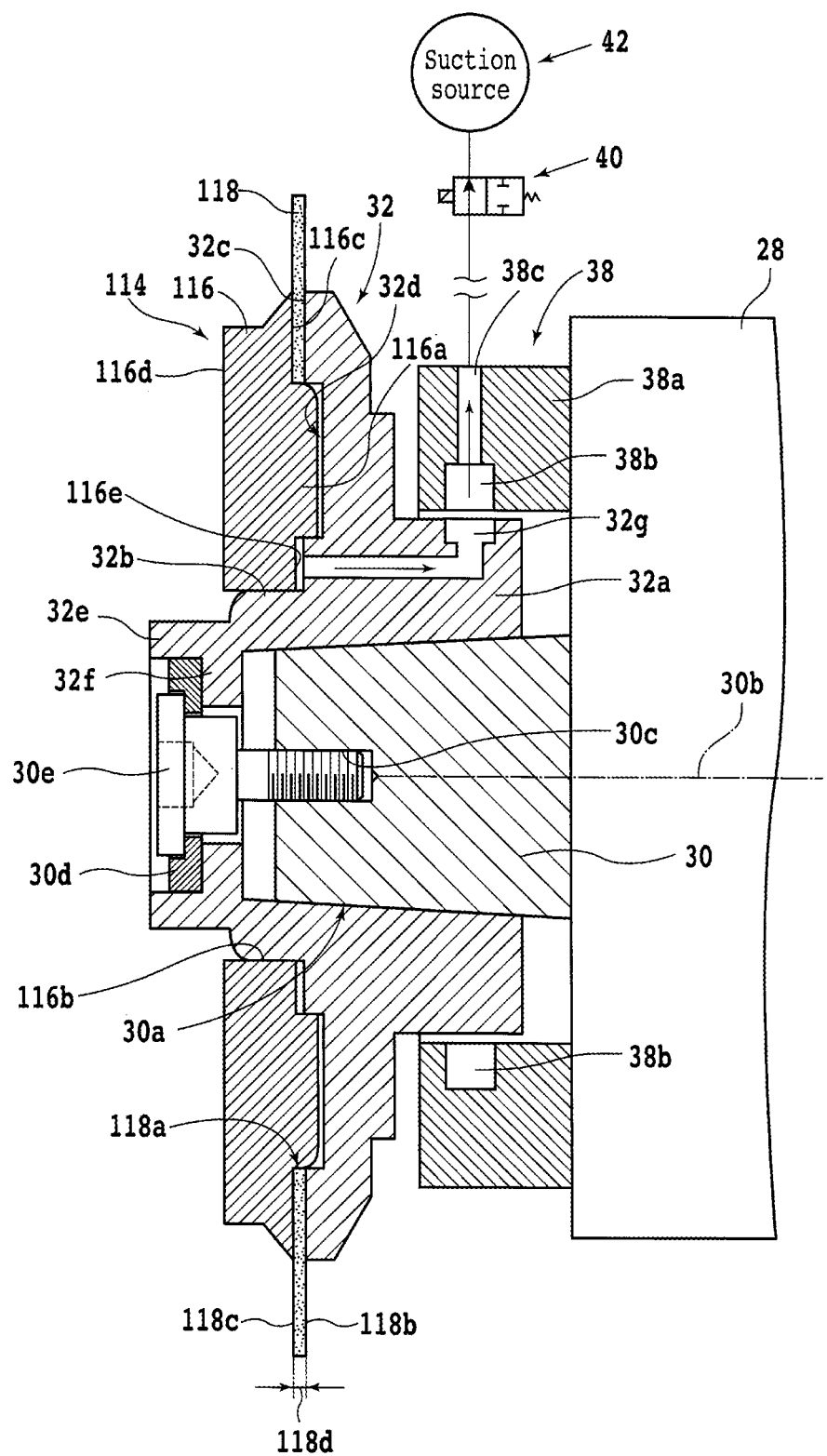
FIG. 13 is a partially sectional side view of the cutting unit according to the third embodiment.

Next, a third embodiment will be described. FIG. 12 is an exploded perspective view of a cutting unit 112 according to the third embodiment, and FIG. 13 is a partially sectional side view of the cutting unit 112 according to the third embodiment. The cutting unit 112 according to the third embodiment does not have the washer type cutting blade 34, but has a hub type cutting blade 114. In such a point, the third embodiment differs from the first embodiment. The cutting blade 114 has an annular base section 116 formed from a metal such as an aluminum alloy.

The base section 116 has an annular projecting part 116*a* corresponding to the projecting part 36*a*. On an inner side than the projecting part 116*a* in a radial direction of the base section 116, a through-opening 116*b* is formed. The second boss section 32*b* of the blade mount 32 is inserted into the through-opening 116*b*. On an outer side than the projecting part 116*a* in a radial direction of the base section 116, an annular flange surface 116*c* is formed. An annular grindstone section 118 functioning as a cutting edge is fixed to the base section 116 with an adhesive, in a state in which an edge part of the through-opening 118*a* is in contact with an outer circumferential part of the projecting part 116*a* and a first surface 118*c* is in contact with the flange surface 116*c*.

In this way, in the third embodiment, by fixing the grindstone section 118 to an outer circumferential part of the base section 116, the base section 116 and the grindstone section 118 are united together. It is to be noted, however, the base section 116 is not formed with the through-hole 36*e*.

When the annular surface 116d (namely, one surface of the cutting blade 114) side located on an opposite side of the projecting part 116a and the flange surface 116c is suction held by the holding jig 74, the cutting blade 114 is suction held by the holding jig 74.

In the case of disposing the cutting blade 114 suction held by the holding jig 74 on the blade mount 32, for example, the mounting position of the holding jig 74 is adjusted such that the projecting part 116a goes into the recess 32d and a second surface 118b (namely, the other surface of the cutting blade 114) located on an opposite side of the first surface 118c makes contact with the flange section 32c. Next, the annular surface 116e located on the inside of the projecting part 116a is sucked toward the blade mount 32 side by the rotary joint 38, whereby the cutting blade 114 is mounted to the blade mount 32.

A thickness 118d of the grindstone section 118 is a length from the second surface 118b to the first surface 118c. While the thickness of the base section 116 is substantially constant in any cutting blade 114, the thickness 118d of the grindstone section 118 is set to various values in the range of, for example, 10 µm to 5 mm. Also in the third embodiment, in a case where the holding jig 74 suction holding the new cutting blade 114 is disposed at the mounting position, as in the first embodiment, the mounting position of the holding jig 74 is adjusted by the control unit 90, according to the difference from the thickness 118d set in the teaching step. As a result, breakage of the cutting blade 114 and damage to the flange section 32c can be prevented.

Figure 14:
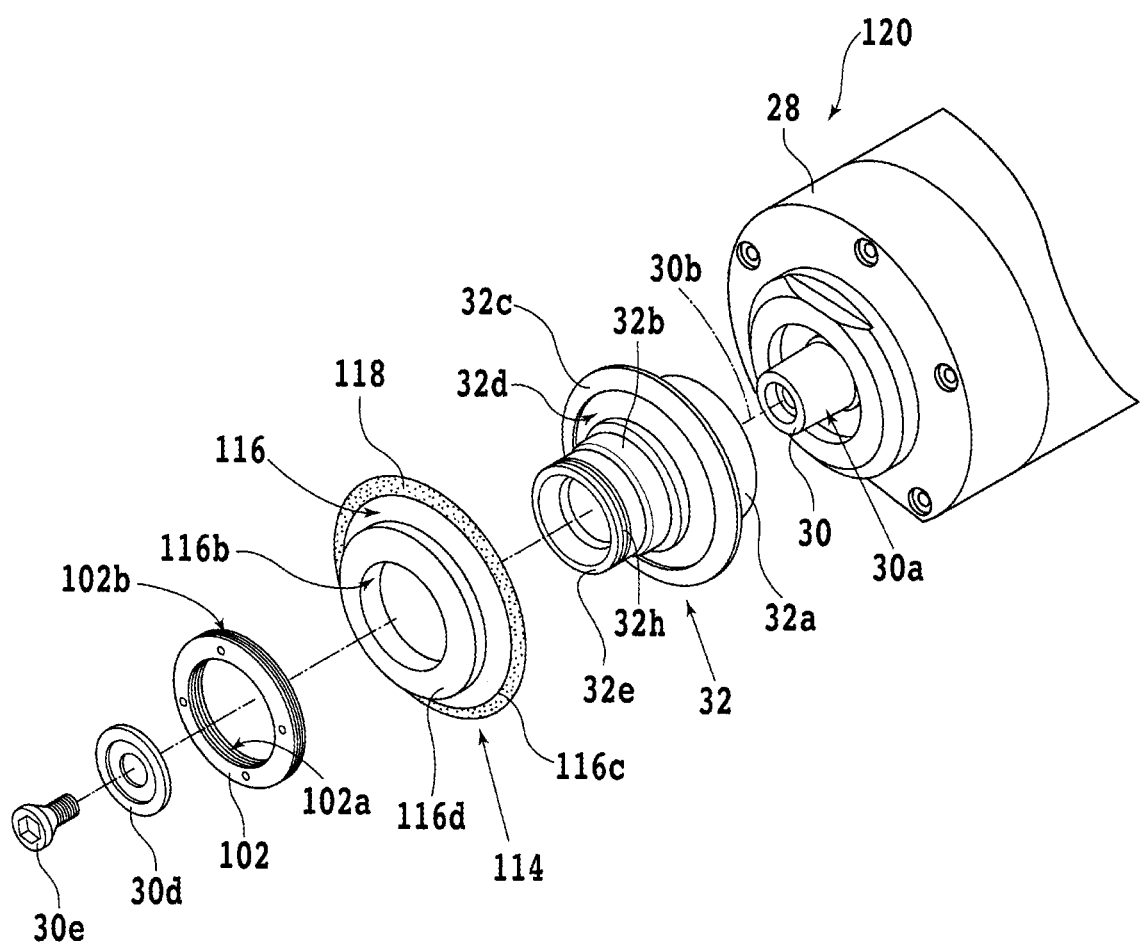
FIG. 14 is an exploded perspective view of a cutting unit according to a fourth embodiment.
Figure 15:
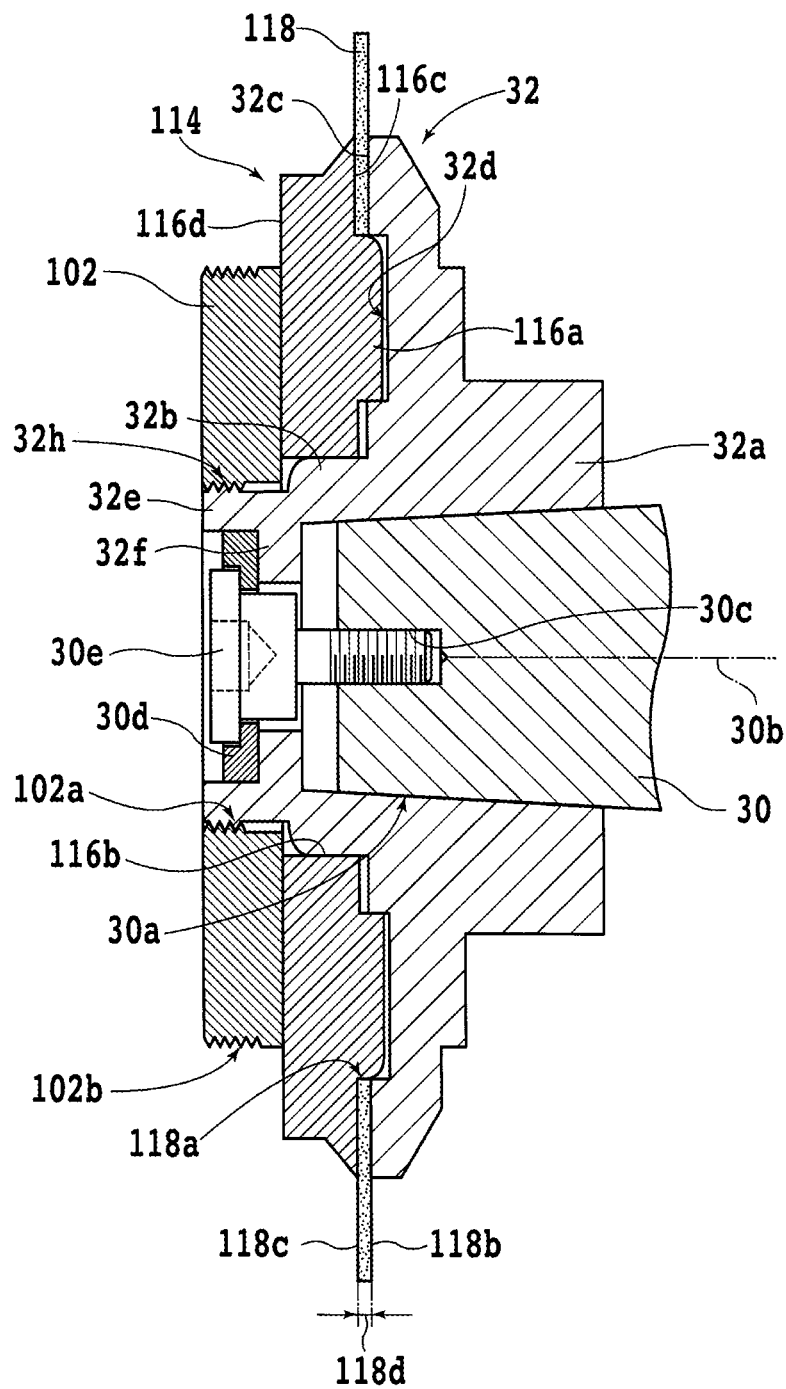
FIG. 15 is a partially sectional side view of the cutting unit according to the fourth embodiment.

Next, a fourth embodiment will be described. FIG. 14 is an exploded perspective view of a cutting unit 120 according to the fourth embodiment, and FIG. 15 is a partially sectional side view of the cutting unit 120 according to the fourth embodiment. In the cutting unit 120 of the fourth embodiment, as in the third embodiment, a hub type cutting blade 114 is mounted to the blade mount 32. It is to be noted, however, that the cutting unit 120 does not have the rotary joint 38.

In the cutting unit 120, instead of suction by a negative pressure, as in the second embodiment (see FIGS. 10 and 11), the presser nut 102 is fastened to the screw groove 32h, whereby the cutting blade 114 is clamped between the presser nut 102 and the flange section 32c. Also in the fourth embodiment, as in the first embodiment, the mounting position of the holding jig 74 suction holding the new cutting blade 114 is adjusted by the control unit 90, according to the difference from the thickness 118d set in the teaching step. As a result, breakage of the cutting blade 114 and damage to the flange section 32c can be prevented.

Other than the aforementioned, the structures, methods, and the like concerning the above embodiments can be modified, as required, in carrying out the present invention insofar as the modifications do not depart from the object of the invention. For example, also in the cutting units 26 and 112 (see FIGS. 2, 3, 12, and 13) in which the cutting blades 34 and 114 are sucked toward the blade mount 32 side by utilizing a negative pressure, as in the cutting units 100, 120 (see FIGS. 10, 11, 14, and 15), the presser nut 102 can be fastened to the third boss section 32e of the blade mount 32.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A blade replacing device used in a cutting apparatus that cuts a workpiece by an annular cutting blade mounted to a tip part of a spindle via a blade mount, the blade mount having a cylindrical boss section which projects in an axial direction of the spindle in a state of being fixed to the tip part of the spindle, and the blade mount further having an annular flange section which is located on a base end part side of the boss section, projects radially outwardly relative to the boss section, and is capable of making contact with a first side surface of the cutting blade in a state in which the cutting blade is positioned radially outwardly of the boss section, the blade replacing device comprising:
   a holding section that detachably holds the cutting blade;
   a moving section that relatively advances and retracts the holding section in a state of holding the cutting blade relative to the spindle in the axial direction of the spindle, and positions the holding section at least at a mounting position at which a second side surface of the cutting blade is located at a distance that is equal to or less than a predetermined distance from the flange section of the blade mount, and further positions the holding section at a released position at which the cutting blade is spaced from the blade mount, wherein the second side surface of the cutting blade is located on an opposite side of the cutting blade than the first side surface of the cutting blade;
   a thickness information acquisition section for acquiring information concerning a thickness of the cutting blade; and
   a control unit, including a processor and a storage device, that receives the thickness of the cutting blade from the thickness information acquisition section,
   wherein the control unit is configured to adjust the mounting position of the holding section, according to the thickness of the cutting blade that was acquired by the control unit from the thickness information acquisition section.

2. The blade replacing device according to claim 1, wherein the thickness information acquisition section includes:
   a camera unit for acquiring an image of identification information provided on the cutting blade, or
   a reader for reading the identification information, or
   a measuring unit for measuring the thickness of the cutting blade.

3. The blade replacing device according to claim 1,
   wherein an annular presser flange clamping the cutting blade together with the flange section is mounted to the blade mount,
   the presser flange has a central hole into which the boss section is inserted, and a through-hole that is provided outside of the central hole and penetrates from one surface side of the presser flange to another surface side of the presser flange, and
   the holding section faces an opening of the through-hole that is exposed to the one surface side of the presser flange, thereby to suction hold the cutting blade which faces that another surface side of the presser flange.

4. The blade replacing device according to claim 1,
   wherein the cutting blade has an annular base section held by the holding section, and an annular grindstone section fixed to an outer circumferential part of the base section, and
   the holding section suction holds one surface side of the base section, thereby to suction hold the cutting blade.

5. The blade replacing device according to claim 1, wherein the thickness information acquisition section includes:

a camera unit for acquiring an image of identification information provided on the cutting blade, and a reader for reading the identification information.

6. The blade replacing device according to claim 1, wherein the thickness information acquisition section includes:

a camera unit for acquiring an image of identification information provided on an accommodating case in which the cutting blade is accommodated, and a reader for reading the identification information.

7. The blade replacing device according to claim 1, wherein the thickness information acquisition section includes a measuring unit for measuring the thickness of the cutting blade.

8. The blade replacing device according to claim 1, wherein the control unit adjusts the mounting position of the holding section by determining a difference between the thickness of the cutting blade acquired by the thickness information acquisition section and a thickness of the cutting blade acquired during a teaching step.

9. The blade replacing device according to claim 1, wherein the thickness information acquisition section includes:

a camera unit for acquiring an image of identification information provided on an accommodating case in which the cutting blade is accommodated, or a reader for reading the identification information, or a measuring unit for measuring the thickness of the cutting blade.

* * * * *